(12) United States Patent
Irwin et al.

(10) Patent No.: US 6,416,098 B1
(45) Date of Patent: Jul. 9, 2002

(54) SATELLITE VEHICLE SHIPPING CONTAINER

(75) Inventors: W. George C. Irwin, Scottsdale; Javier Leija, Chandler; John R. McBride, Phoenix; Mark M. Kanne, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/706,962

(22) Filed: Nov. 6, 2000

(51) Int. Cl.⁷ .................................................. B66C 3/00
(52) U.S. Cl. ..................................... 294/68.1; 294/67.2
(58) Field of Search ........................... 294/68.1, 68.26, 294/68.3, 67.1, 67.2, 67.21; 220/23.83, 23.86, 831, 832

(56) References Cited

U.S. PATENT DOCUMENTS

| | | | |
|---|---|---|---|
| 909,222 A | * 1/1909 | Reynolds | 294/68.1 |
| 1,599,953 A | * 9/1926 | Clapp | 294/68.1 |
| 3,282,621 A | * 11/1966 | Peterson | 294/68.1 |
| 3,405,665 A | * 10/1968 | Slonim | 294/68.1 |
| 3,620,388 A | * 11/1971 | Mansson | 294/68.1 |
| 4,666,034 A | * 5/1987 | Johnson et al. | 294/68.1 |
| 4,878,596 A | * 11/1989 | Cawley et al. | 294/68.26 |
| 5,344,203 A | * 9/1994 | Tollenaere | 294/68.1 |
| 5,755,472 A | * 5/1998 | Clive-Smith | 294/67.1 |

FOREIGN PATENT DOCUMENTS

| | | | |
|---|---|---|---|
| CA | 960159 | * 12/1974 | 294/68.1 |
| EP | WO 860606 | * 1/1986 | 294/68.26 |
| JP | 404057782 | * 2/1992 | 294/68.1 |

* cited by examiner

Primary Examiner—Dean J. Kramer
Assistant Examiner—Paul T. Chin
(74) Attorney, Agent, or Firm—Frank J. Bogacz

(57) ABSTRACT

A shipping container (100) for transporting and handling a satellite (106) is disclosed. The shipping container (100) includes a support structure (102) for securing the satellite during transport, a base (116) hingedly connected to the support structure (102), and a cover (104) to protect the satellite (106) during transport, coupled to the support structure (102). The shipping container (100) also includes a upending actuator (112), a ballast arm (110), and a handling sling (108) to facilitate removal of the satellite (106) from the shipping container (100).

5 Claims, 1 Drawing Sheet

SATELLITE VEHICLE SHIPPING CONTAINER

BACKGROUND OF THE INVENTION

1. Technical Field

The present invention relates, generally, to methods and apparatus for transporting and handling a satellite and, more particularly, to an integrated shipping container including a support structure, a cover, and an integral upending actuator.

2. Background Art and Technical Problems

The transportation of space vehicles (SV), for example, telecommunications satellites, from the place of manufacture to the launch site can be a time consuming, expensive, and cumbersome exercise. Presently known shipping containers include a handling dolly to which a satellite is secured within a shipping box. The handling dolly and shipping container interface to act as a shock absorber inasmuch as satellites may be shipped over the road, over rail or even using aircraft. A typical shipping container may measure 8 feet (')×8'×24', which allows a maximum of 2 satellite shipping containers on a single semi-trailer. In this regard, since many typical satellites are on the order of 12' tall or more, it is necessary to transport the satellite in a horizontal orientation, recognizing that the satellite must then be "upended" into a vertical position before being placed on the launch vehicle.

In prior art systems, once the shipping container is transported from the place of manufacture of the satellite to the place of launch, the satellite is unloaded from the shipping container (horizontally), removed from the handling dolly, and attached to an upender which orients the satellite in a vertical position, for example, using a worm gear to rotate the satellite by 90 degrees. Once in a vertical orientation, a metal structure known as a "strong back" is bolted to the satellite. The strong back typically includes a handling sling to allow the satellite to be lifted, using a crane, and placed on the launch vehicle (e.g. a rocket).

This entire process can take up to three days or more using prior art techniques. A system and method for transporting and processing of satellites is thus needed that overcomes the shortcomings of the prior art.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

Figure 1:
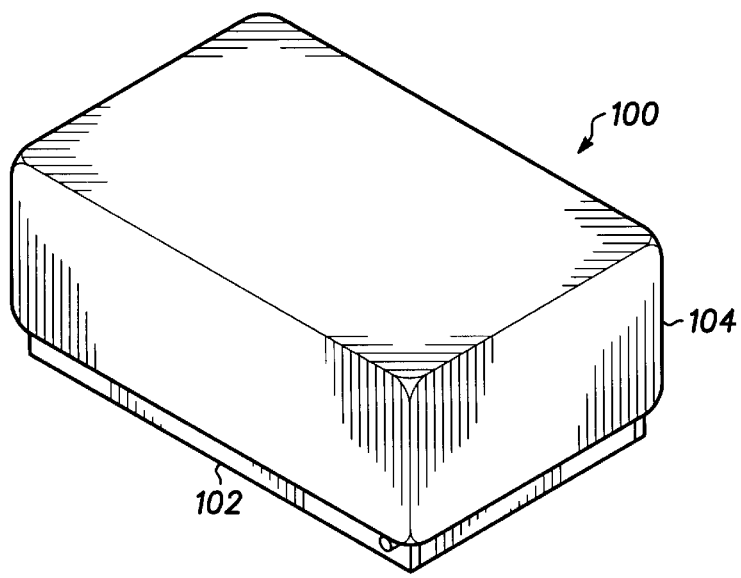
FIG. 1 is a perspective view of an exemplary shipping container in accordance with the present invention, showing an outer cover disposed on top of a support structure.

Referring now to FIG. 1, a shipping container 100 in accordance with the present invention comprises a support structure 102 and a cover 104. Cover 104 is suitably configured to be secured to support structure 102 and to protect the satellite from damage during transportation of the satellite. Cover 104 may be made from a hard, preferably recyclable plastic or other lightweight, yet protective, material.

Figure 2:
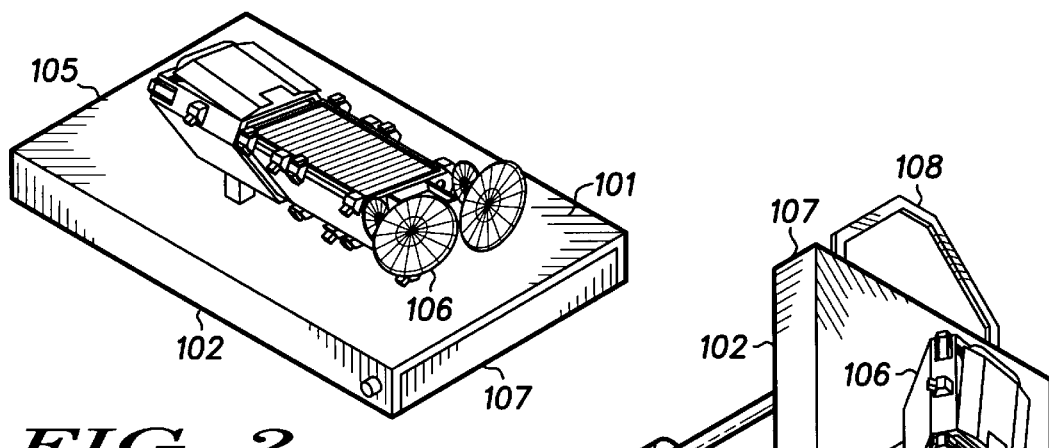
FIG. 2 illustrates the shipping container of FIG. 1 with the cover removed exposing the satellite.
Figure 3:
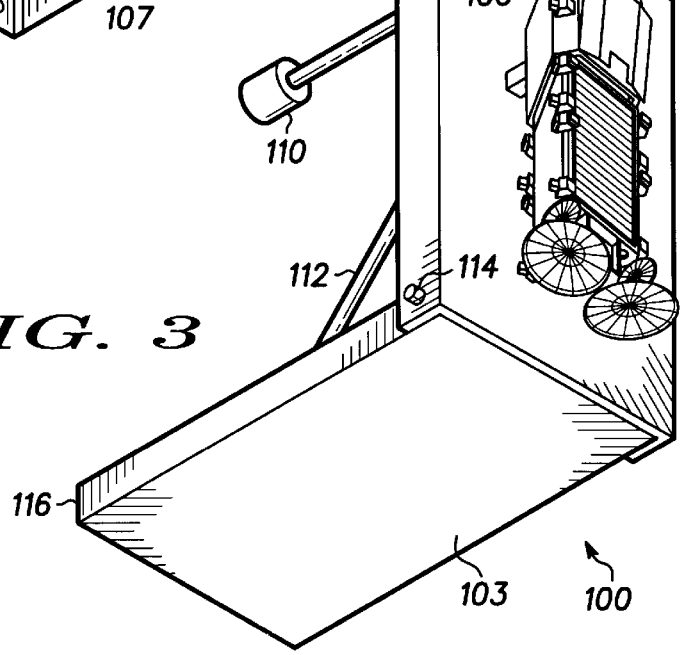
FIG. 3 illustrate the shipping container of FIG. 2, after the upending actuator has rotated the support structure and satellite into a vertical position.

FIG. 2 illustrates shipping container 100 with cover 104 removed to expose a satellite 106. Those skilled in the art will appreciate that the various components set forth in the drawing figures are shown schematically to highlight the function of and interaction among the various components of the invention. Referring now to FIG. 3, shipping container 100 further comprises a base 116, an upending actuator 112, a ballast arm 110, and handling sling 108.

Support structure 102 is suitably hingedly connected to base 116, for example, by a pivot 114. In a preferred embodiment, pivot 114 comprises an elongated shaft which functions as a hinge; alternatively, pivot 114 may comprise a cotter pin assembly, a disengageable hinge, dowel, or any other device, which allows support structure 102 to pivot with respect to base 116, and which can be easily removed when it is desired to separate support structure 102 from base 116. Shipping container 100 has a first side 101, a second side 103 (visible in FIG. 3), a first end 105, and a second end 107.

The advantages of the integral satellite transporting apparatus of the present invention will now be described.

Satellites are often manufactured in a facility that is remote from the point at which the satellite is ultimately launched from the earth. Accordingly, the satellite transportation system of the present invention accommodates both the packaging and shipping of the satellite from the point of manufacture to the point of launch, as well as the handling and manipulation of the satellite onto the launch vehicle (not shown). More particularly, once a satellite is manufactured (or a previously manufactured satellite is removed from inventory or storage), satellite 106 is securely attached to support structure 102, whereupon support structure 102 is securely fastened to base 116. Prior to shipping satellite 106 to the launch site, cover 104 is placed over satellite 106 and secured to one or both of support structure 102 and base 116. In this way, cover 104, base 116, and support structure 102 protect satellite 106 while it is being moved from one site to another. In addition, support structure 102 can be configured to function as a shock absorber or to otherwise isolate satellite 106 from shock, vibrations, and other mechanical forces expected to be incurred during shipment.

Once satellite 106 arrives at the launch site, cover 104 is removed to expose satellite 106. For convenience, satellite 106 is advantageously transported in the horizontal position (shown in FIGS. 1 and 2); however, in order to attach satellite 106 to the launch vehicle, it is necessary to rotate satellite 106 into the vertical position shown in FIG. 3.

Upending actuator 112 is suitably configured to cause support structure 102 and satellite 106 to pivot about pivot 114 to thereby upend satellite 106. In particular, when upending actuator 112 is in a retracted position, support structure 102 (and, hence, satellite 106) is substantially parallel to base 116. When upending actuator 112 is extended, support structure 102 and satellite 106 are moved into a position substantially orthogonal to base 116. Upending actuator may suitably comprise a pneumatic, hydraulic, rotary crank, socket or any other convenient mechanism for causing support structure 102 to pivot with respect to base 116.

Once satellite 106 is in the vertical position, upending actuator 112 is suitably disconnected from support structure 102; alternatively, upending actuator 112 may also be disconnected from base 116. In order to maneuver satellite 106 to the launch vehicle, pivot 114 is suitably disengaged, thereby decoupling support structure 102 from base 116. Handling sling 108 is then extended from support structure 102, such that handling sling 108 may be grasped by a crane or other apparatus used to maneuver satellite 106 onto the launch field (not shown).

To facilitate the convenient maneuvering of satellite 106 onto the launch vehicle, ballast arm 110 may be extended from support structure 102 to counterbalance the weight of satellite 106 and thereby allow support structure 102 to maintain a substantially vertical orientation as satellite 106 is maneuvered onto the launch vehicle. In this regard, ballast arm 110 may be configured to receive a counterweight, or, alternatively, ballast arm 110 may simply function as a counterweight. When the assembly including support structure 102 and satellite 106 is maneuvered to the launch vehicle, satellite 106 is then secured to the launch vehicle, either directly or in conjunction with support structure 102.

In accordance with a further aspect of the present invention, one or more of base 116, support structure 102, and cover 104 may suitably be made from a recyclable material, for example, a hard plastic, to thereby eliminate the need to ship these components back to the place of manufacture.

Although the present invention has been described with reference to the drawing figures, it should be appreciated that the invention is not limited to the specific forms shown and described herein. Rather, the spirit and scope of the present invention is defined by the appended claims.

What is claimed is:

1. An apparatus for transporting a satellite in a transport position to a launch site and for orienting the satellite in an attachment position for attachment to a launch vehicle comprising:

a support structure having a first side, a second side disposed opposite to said first side, and first and second ends, said support structure configured for rigid attachment to said satellite on said first side;

a handling sling extendable from said first end of said support structure for enabling the lifting of said satellite, a ballast arm extendable from said second side of said support structure;

a base having a pivot end hingedly coupled to said support structure; and an upending actuator connecting to said base and to said support structure;

wherein said base and said support structure are substantially horizontal in the transport position when said upending actuator is in a retracted position and said support structure is substantially vertical in the attachment position when said upending actuator is in an extended position.

2. The apparatus of claim 1, further comprising:

a cover configured for rigid attachment to at least one of said base and said support structure, said cover comprising a cavity for storing said satellite.

3. The apparatus of claim 1, further comprising:

a hinge configured to hingedly connect said pivot end of said base to said second end of said support structure;

wherein said hinge is removable such that when removed, said support structure becomes disconnected from said base.

4. The apparatus of claim 3, wherein said upending actuator is removably connected to said support structure.

5. The apparatus of claim 4, wherein said ballast arm is configured to support a counterweight such that said satellite is disposed substantially vertically when said handling sling is engaged by a crane and said support structure is disconnected from said base.

* * * * *